US010920871B2

(12) United States Patent
Kita et al.

(10) Patent No.: US 10,920,871 B2
(45) Date of Patent: Feb. 16, 2021

(54) LUBRICATING FLUID SUPPLY STRUCTURE OF POWER TRANSMISSION DEVICE

(71) Applicant: Honda Motor Co., Ltd., Tokyo (JP)

(72) Inventors: Hiroyuki Kita, Saitama (JP); Kazuaki Watanabe, Saitama (JP); Naomichi Tonokura, Saitama (JP); Junichi Yamaguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 15/928,099

(22) Filed: Mar. 22, 2018

(65) Prior Publication Data

US 2018/0274660 A1 Sep. 27, 2018

(30) Foreign Application Priority Data

Mar. 24, 2017 (JP) ................................. 2017-060128

(51) Int. Cl.
*F16H 57/04* (2010.01)
*F16H 3/66* (2006.01)

(52) U.S. Cl.
CPC ..... *F16H 57/0445* (2013.01); *F16H 57/0423* (2013.01); *F16H 57/0424* (2013.01);
(Continued)

(58) Field of Classification Search
CPC ............. F16H 57/0445; F16H 57/0423; F16H 57/0424; F16H 57/0435; F16H 57/0471;
(Continued)

(56) References Cited

U.S. PATENT DOCUMENTS 3,416,633 A * 12/1968 Swearingen ............ F16N 39/04
184/109
5,046,306 A * 9/1991 Borre, Jr. ................. F01D 25/18
184/6.11
(Continued)

FOREIGN PATENT DOCUMENTS

| CN | 101280845 | 10/2008 |
| CN | 106352060 | 1/2017 |

(Continued)

OTHER PUBLICATIONS

"Office Action of Japan Counterpart Application", dated Jan. 8, 2019, with English translation thereof, p. 1-p. 6.
(Continued)

*Primary Examiner* — Michael A Riegelman
(74) *Attorney, Agent, or Firm* — JCIPRNET (57) ABSTRACT

Provided is a lubricating fluid supply structure of a power transmission device capable of stably supplying a lubricating fluid to a built-in part to which the lubricating fluid is supplied with a high priority. A supply pipe (64a) includes a first main pipe line (L1) connected to a priority part, a second main pipe line (L2) connected to a non-priority part, and an intermediate pipe line (LM) connecting the first main pipe line (L1) and the second main pipe line (L2) to each other. A first height (H1) of a connection part of the first main pipe line (L1) connected to the intermediate pipe line (LM) is lower than a second height (H2) located at the highest position in a flow path bottom surface of the intermediate pipe line (LM).

12 Claims, 8 Drawing Sheets

(52) U.S. Cl.
CPC ..... *F16H 57/0435* (2013.01); *F16H 57/0471* (2013.01); *F16H 57/0483* (2013.01); *F16H 3/66* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC .................. F16H 57/0483; F16H 3/66; F16H 2200/0069; F16H 2200/2012; F16H 2200/2046; F16H 2200/2048; F16H 2200/2066; F16H 2200/2082
See application file for complete search history.

(56) References Cited

U.S. PATENT DOCUMENTS

| | | | | |
|---|---|---|---|---|
| 5,121,815 | A | * | 6/1992 | Francois ................. B64C 27/12 184/6.12 |
| 5,644,954 | A | | 7/1997 | Matsufuji |
| 2017/0175875 | A1 | * | 6/2017 | Lapeyre .............. F16H 57/0442 |
| 2017/0219083 | A1 | * | 8/2017 | Ito ....................... F16H 57/0424 |
| 2018/0266536 | A1 | * | 9/2018 | Kita ...................... F16H 57/029 |
| 2018/0274660 | A1 | * | 9/2018 | Kita .................... F16H 57/0423 |

FOREIGN PATENT DOCUMENTS

| | | |
|---|---|---|
| GB | 2224330 | 5/1990 |
| JP | 2007315506 | 12/2007 |
| WO | 2011062059 | 5/2011 |

OTHER PUBLICATIONS

Office Action of China Counterpart Application, with English translation thereof, dated Aug. 25, 2020, pp. 1-13.

* cited by examiner

| | C1 | C2 | C3 | B1 | B2 | B3 | F1 | GEAR RATIO | COMMON RATIO |
|---|---|---|---|---|---|---|---|---|---|
| Rvs | | | ○ | | ○ | | L | 4.008 | |
| 1st | | | | ○ | (○) | | R/L | 5.233 | 1.554 |
| 2nd | | ○ | | ○ | ○ | | R | 3.367 | 1.465 |
| 3rd | | | ○ | ○ | ○ | | R | 2.298 | 1.348 |
| 4th | | ○ | ○ | ○ | | | R | 1.705 | 1.251 |
| 5th | ○ | | (○) | ○ | | | R | 1.363 | 1.363 |
| 6th | ○ | ○ | ○ | | | | R | 1.000 | 1.273 |
| 7th | ○ | | ○ | | ○ | | R | 0.786 | 1.196 |
| 8th | ○ | ○ | | | ○ | | R | 0.657 | 1.126 |
| 9th | ○ | | | | ○ | ○ | R | 0.584 | 1.120 |
| 10th | ○ | ○ | | | | ○ | R | 0.520 | |

LUBRICATING FLUID SUPPLY STRUCTURE OF POWER TRANSMISSION DEVICE

CROSS-REFERENCE TO RELATED APPLICATION

This application claims the priority benefit of Japan application serial no. 2017-060128, filed on Mar. 24, 2017. The entirety of the above-mentioned patent application is hereby incorporated by reference herein and made a part of this specification.

BACKGROUND

Technical Field

The disclosure relates to a lubricating fluid supply structure of a power transmission device for supplying a lubricating fluid to a plurality of built-in parts disposed inside a case of the power transmission device through a supply pipe.

Description of Related Art

Hitherto, as a power transmission device mounted on a vehicle or the like, a power transmission device including a transmission shifting and outputting driving force of an internal-combustion engine, a differential device distributing the driving force output from the transmission to left and right drive wheels, and a transfer device distributing the driving force transmitted to the differential device to other drive wheels located in the longitudinal direction has been known.

As a lubricating fluid supply structure of such a power transmission device, a lubricating fluid supply structure which discharges a lubricating fluid supplied to a fluid pressure operation mechanism disposed inside a case into a case and supplies the discharged lubricating fluid to built-in parts disposed inside the case to lubricate or cool the built-in parts is known (for example, see Patent Document 1).

In such a lubricating fluid supply structure, a branch pipe line branched from a main pipe line is connected to the built-in parts so that the lubricating fluid is supplied to the built-in parts through the main pipe line and the branch pipe line. Then, the amount of the lubricating fluid distributed to the built-in parts is set by a diameter of an orifice formed in the branch pipe line.

[Patent Document 1] PCT Publication WO 2011/062059

Incidentally, in the conventional lubricating fluid supply structure of the power transmission device disclosed in Patent Document 1, when the amount of the lubricating fluid supplied to the main pipe line is small, it is difficult to supply the lubricating fluid from the main pipe line to the built-in parts. Accordingly, there is concern that the lubricating fluid cannot be supplied to the built-in part having a high priority according to a predetermined distribution amount.

SUMMARY

The disclosure is made in view of the above-described circumstances and is to provide a lubricating fluid supply structure of a power transmission device capable of stably supplying a lubricating fluid to a built-in part to which the lubricating fluid is supplied with a high priority.

According to the disclosure, there is provided a lubricating fluid supply structure of a power transmission device for supplying a lubricating fluid to a plurality of built-in parts (which are, for example, an idle shaft 35, a front differential gear 4, and a second bearing BRG2 in the embodiment and are the same in the following description) disposed inside a case (which is, for example, a transmission case 31 in the embodiment and is the same in the following description) of a power transmission device (which is, for example, a power transmission device PT in the embodiment and is the same in the following description) through a supply pipe (which is, for example, a supply pipe 64a in the embodiment and is the same in the following description). The supply pipe includes a first main pipe line (which is, for example, a first main pipe line L1 in the embodiment and is the same in the following description), an intermediate pipe line (which is, for example, an intermediate pipe line LM in the embodiment and is the same in the following description) connected to the first main pipe line, and a second main pipe line (which is, for example, the second main pipe line L2 in the embodiment and is the same in the following description) connected to the intermediate pipe line. The first main pipe line is connected to a priority part (which is, for example, an idle shaft 35 in the embodiment and is the same in the following description) to which the lubricating fluid is supplied with a high priority among the plurality of built-in parts. The second main pipe line is connected to non-priority parts (which are, for example, a front differential gear 4 and a second bearing BRG2 in the embodiment and are the same in the following description) to which the lubricating fluid is supplied with a low priority among the plurality of built-in parts. A flow path bottom surface (which is, for example, a first height H1 in the embodiment and is the same in the following description) of a connection part between the first main pipe line and the intermediate pipe line is lower than a flow path bottom surface (which is, for example, a second height H2 in the embodiment and is the same in the following description) located at the highest position in the flow path bottom surface of the intermediate pipe line.

BRIEF DESCRIPTION OF THE DRAWINGS

FIGS. 7A and 7B are perspective views showing a shape of an intermediate pipe line of a supply pipe fixed to the transmission case of FIG. 5, where FIG. 7A shows an outer shape of the intermediate pipe line and FIG. 7B shows an inner structure.

DESCRIPTION OF THE EMBODIMENTS

According to the disclosure, there is provided a lubricating fluid supply structure of a power transmission device for supplying a lubricating fluid to a plurality of built-in parts (which are, for example, an idle shaft 35, a front differential gear 4, and a second bearing BRG2 in the embodiment and are the same in the following description) disposed inside a case (which is, for example, a transmission case 31 in the embodiment and is the same in the following description) of a power transmission device (which is, for example, a power transmission device PT in the embodiment and is the same in the following description) through a supply pipe (which is, for example, a supply pipe 64a in the embodiment and is the same in the following description). The supply pipe includes a first main pipe line (which is, for example, a first main pipe line L1 in the embodiment and is the same in the following description), an intermediate pipe line (which is, for example, an intermediate pipe line LM in the embodiment and is the same in the following description) connected to the first main pipe line, and a second main pipe line (which is, for example, the second main pipe line L2 in the embodiment and is the same in the following description) connected to the intermediate pipe line. The first main pipe line is connected to a priority part (which is, for example, an idle shaft 35 in the embodiment and is the same in the following description) to which the lubricating fluid is supplied with a high priority among the plurality of built-in parts. The second main pipe line is connected to non-priority parts (which are, for example, a front differential gear 4 and a second bearing BRG2 in the embodiment and are the same in the following description) to which the lubricating fluid is supplied with a low priority among the plurality of built-in parts. A flow path bottom surface (which is, for example, a first height H1 in the embodiment and is the same in the following description) of a connection part between the first main pipe line and the intermediate pipe line is lower than a flow path bottom surface (which is, for example, a second height H2 in the embodiment and is the same in the following description) located at the highest position in the flow path bottom surface of the intermediate pipe line.

In this way, in the lubricating fluid supply structure of the disclosure, a flow path bottom surface of the connection part between the first main pipe line and the intermediate pipe line is located at a position lower than a flow path bottom surface located at the highest position of the intermediate pipe line located at the downstream side of the first main pipe line.

Accordingly, since it is possible to prevent the lubricating fluid from flowing from the first main pipe line into the intermediate pipe line when the lubricating fluid supply amount is small, the lubricating fluid flows into the first main pipe line with a high priority. As a result, it is possible to stably supply the lubricating fluid to the priority part connected to the first main pipe line.

Thus, according to the lubricating fluid supply structure of the disclosure, it is possible to supply the lubricating fluid to the priority part connected to the first main pipe line with a high priority by suppressing the lubricating fluid from flowing to the intermediate pipe line (further, the non-priority part).

Further, in the lubricating fluid supply structure of the power transmission device of the disclosure, an angle (which is, for example, a first angle θ1 in the embodiment and is the same in the following description) formed between the first main pipe line and the intermediate pipe line may be smaller than an angle (which is, for example, a second angle θ2 in the embodiment and is the same in the following description) formed between an upstream portion (which is, for example, an upstream portion L11 in the embodiment and is the same in the following description) of the first main pipe line in relation to the connection part between the first main pipe line and the intermediate pipe line and a downstream portion (which is, for example, a downstream portion L12 in the embodiment and is the same in the following description) of the first main pipe line in relation to the connection part.

Particularly, a downstream portion of the first main pipe line in relation to the connection part between the first main pipe line and the intermediate pipe line may extend linearly with respect to an upstream portion of the first main pipe line in relation to the connection part.

With such a configuration, since the lubricating fluid does not easily flow from the first main pipe line to the intermediate pipe line, it is possible to further stably supply the lubricating fluid to the priority part to which the lubricating fluid is supplied with a high priority.

Further, in the lubricating fluid supply structure of the power transmission device of the disclosure, at least an upstream end portion of the intermediate pipe line may extend upward from the first main pipe line.

With such a configuration, the intermediate pipe line can be easily set to a high position on the whole.

Further, in the lubricating fluid supply structure of the power transmission device of the disclosure, the intermediate pipe line may be provided with an orifice (which is, for example, a first orifice LMa in the embodiment and is the same in the following description).

Particularly, a cross-sectional area of the orifice may be set to be smaller than a cross-sectional area of the first main pipe line.

With such a configuration, since the inflow of the lubricating fluid toward the downstream side of the orifice of the intermediate pipe line is suppressed by the orifice, the lubricating fluid is easily accumulated in the first main pipe line. As a result, it is possible to further stably supply the lubricating fluid to the priority part to which the lubricating fluid is supplied with a high priority.

Further, in the lubricating fluid supply structure of the power transmission device of the disclosure, when the intermediate pipe line is provided with the orifice, the second main pipe line may be provided with a branch pipe line (which corresponds to, for example, a first branch pipe line L21 and a second branch pipe line L22 in the embodiment and is the same in the following description) connected to the non-priority part. A cross-sectional area of the orifice may be set to be larger than a sum of a minimal cross-sectional area (which is, for example, a cross-sectional area of a first orifice LMa in the embodiment and is the same in the following description) of the second main pipe line and a minimal cross-sectional area (which corresponds to, for example, a cross-sectional area of a second orifice L2a, a cross-sectional area of a third orifice L2b, and a cross-sectional area of a fourth orifice L2c in the embodiment and are the same in the following description) of the branch pipe line.

With such a configuration, since the amount of the lubricating fluid flowing from the intermediate pipe line to the second main pipe line is larger than the amount of the lubricating fluid discharged from the second main pipe line and the branch pipe line, it is possible to accumulate the lubricating fluid inside the intermediate pipe line to a certain degree when the flow rate of the lubricating fluid is large. Accordingly, even when the priority part connected to the first main pipe line is preferentially lubricated due to a small flow rate, the lubricating fluid can be also supplied to the non-priority part to a certain degree by the lubricating fluid accumulated in the intermediate pipe line.

Hereinafter, a vehicle equipped with a power transmission device including a lubricating fluid supply structure according to an embodiment will be described with reference to the drawings.

Figure 1:
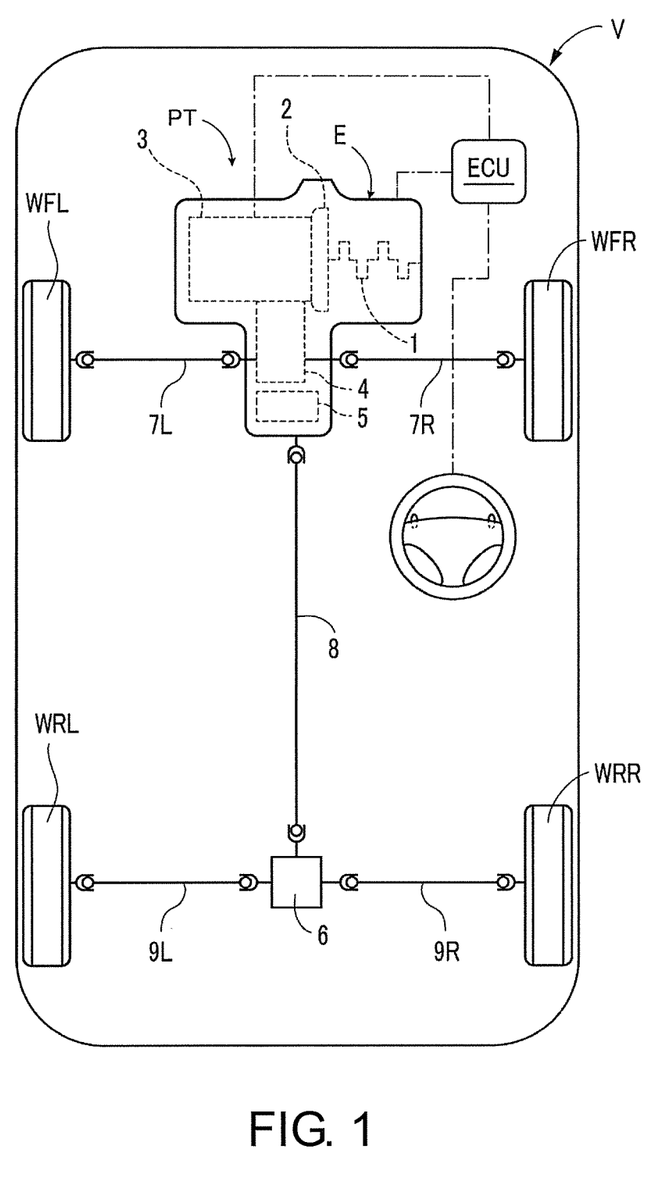
FIG. 1 is an explanatory diagram schematically showing a vehicle equipped with a power transmission device having a lubricating fluid supply structure according to an embodiment.

As illustrated in FIG. 1, an engine E (an internal combustion engine or a driving source) is mounted transversely on the vehicle body so that a crankshaft 1 is directed in a lateral direction of a vehicle body of a vehicle V. A driving force of the engine E is transmitted to a left front wheel WFL, a right front wheel WFR, a left rear wheel WRL, and a right rear wheel WRR via a power transmission device PT.

The power transmission device PT includes a torque converter 2 connected to the crankshaft 1, a transmission 3 connected to the torque converter 2, a front differential gear 4 connected to the transmission 3, a transfer device 5 connected to the front differential gear 4, and a rear differential gear 6 connected to the transfer device 5.

The front differential gear 4 is connected to the left front wheel WFL and the right front wheel WFR via a front left axle 7L and a front right axle 7R. The rear differential gear 6 is connected to the transfer device 5 via a propeller shaft 8, and is connected to the left rear wheel WRL and the right rear wheel WRR via a rear left axle 9L and a rear right axle 9R.

Figure 2:
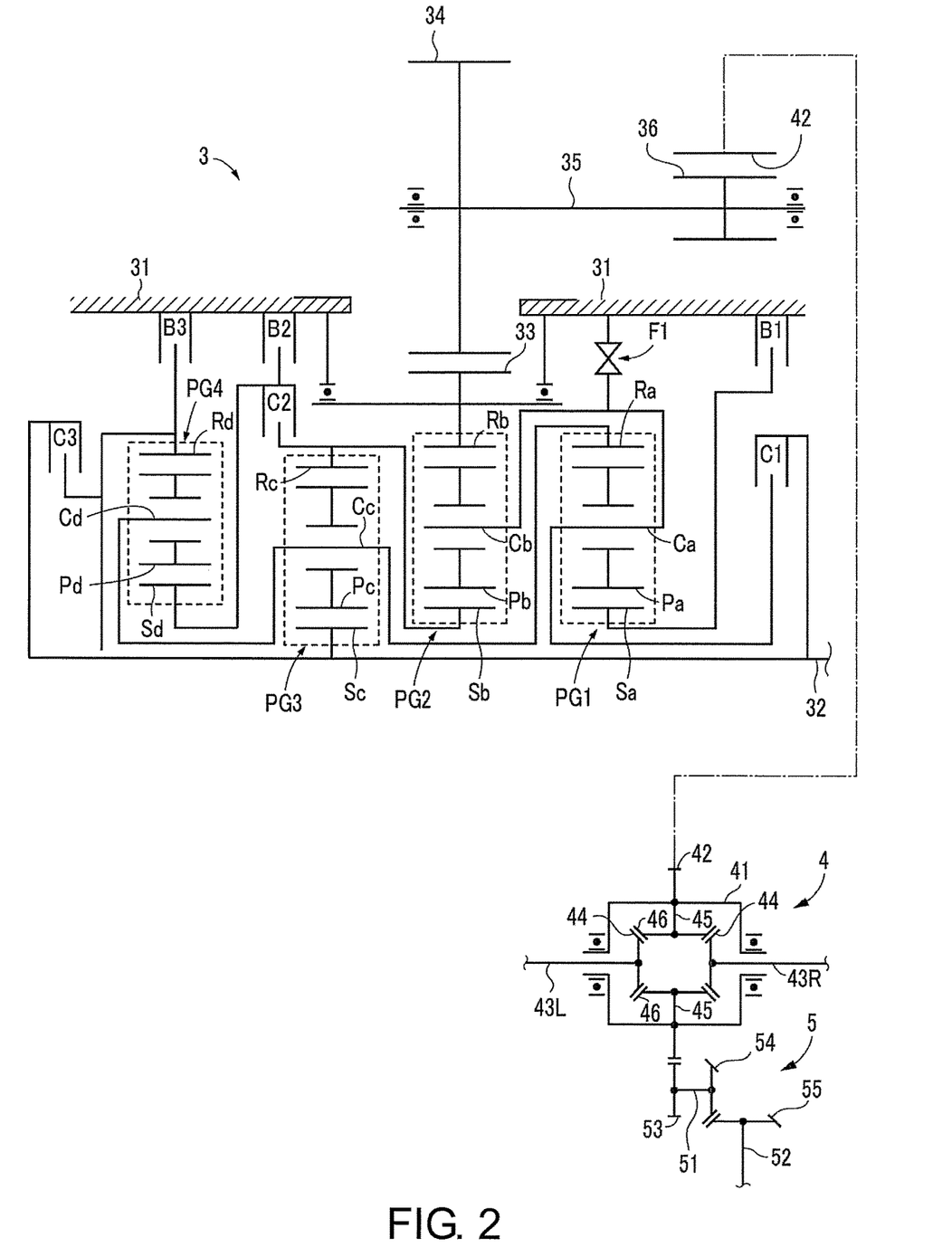
FIG. 2 is a skeleton diagram showing a transmission mounted on the vehicle of FIG. 1.

As illustrated in a skeleton diagram of FIG. 2, the transmission 3 includes an input shaft 32 rotatably journaled inside a transmission case 31 (casing), and an output member 33 including an output gear arranged concentrically with the input shaft 32.

A driving force output from the engine E is transmitted to the input shaft 32 via the torque converter 2 having a lock-up clutch and a damper.

Rotation of the output member 33 is transmitted to the left front wheel WFL and the right front wheel WFR (see FIG. 1) via an idle gear 34 that engages with the output member 33, an idle shaft 35 that journals the idle gear 34, a final drive gear 36 journaled on the idle shaft 35, and a final driven gear 41 (that is, the front differential gear 4) that engages with the final drive gear 36.

In the power transmission device PT, a single plate type or multiple plate type of starting clutch configured to be frictionally engageable may be provided instead of the torque converter 2.

Inside the transmission case 31, a first planetary gear mechanism PG1, a second planetary gear mechanism PG2, a third planetary gear mechanism PG3, and a fourth planetary gear mechanism PG4 are arranged concentrically with the input shaft 32 in this order from the engine E side.

The third planetary gear mechanism PG3 is configured as a so-called single pinion type planetary gear mechanism having, as elements, a sun gear Sc, a ring gear Rc, and a carrier Cc that rotatably and revolvably journals a pinion Pc that engages with the sun gear Sc and the ring gear Rc.

The so-called single pinion type planetary gear mechanism is also called a minus planetary gear mechanism or a negative planetary gear mechanism because the ring gear rotates in a direction different from that of the sun gear when the carrier is fixed and the sun gear is rotated. In the so-called single pinion type planetary gear mechanism, when the ring gear is fixed and the sun gear is rotated, the carrier rotates in the same direction as the sun gear.

Figure 3:
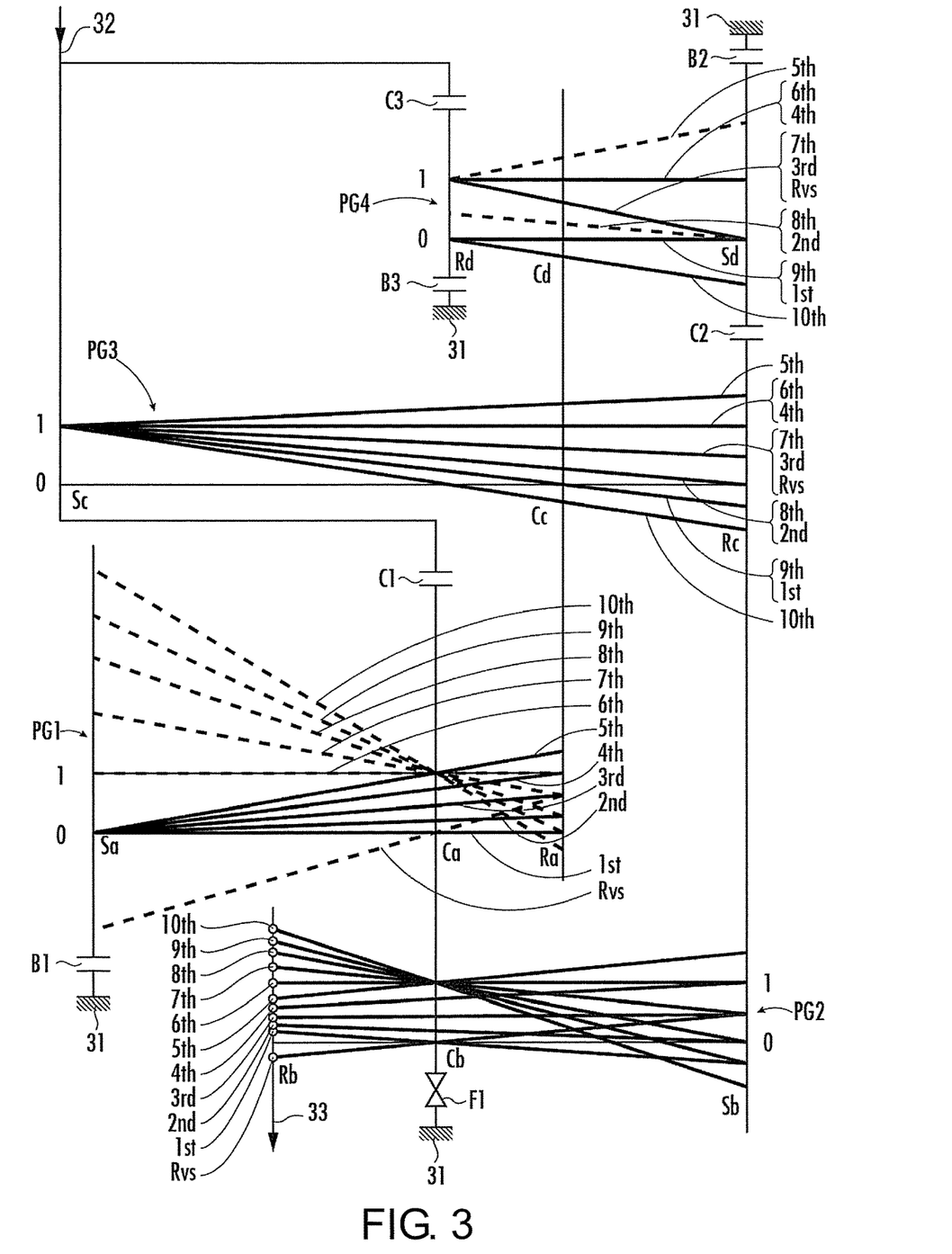
FIG. 3 is a alignment chart of a planetary gear mechanism of the transmission of FIG. 2.

An alignment chart (a diagram capable of representing ratios between relative rotational speeds of three elements including the sun gear, the carrier, and the ring gear using straight lines (speed lines)) illustrated in a second part from the top in FIG. 3 is an alignment chart of the third planetary gear mechanism PG3. As illustrated in this alignment chart, when the sun gear Sc, the carrier Cc, and the ring gear Rc that are three elements of the third planetary gear mechanism PG3 are a 1st element, a 2nd element, and a 3rd element from the left in an arrangement order at intervals corresponding to the gear ratio (number of teeth of the ring gear/number of teeth of the sun gears) in the alignment chart, respectively, the 1st element is the sun gear Sc, the 2nd element is the carrier Cc, and the 3rd element is the ring gear Rc.

Here, a ratio between an interval from the sun gear Sc to the carrier Cc and an interval from the carrier Cc to the ring gear Re is set to h:1 when a gear ratio of the third planetary gear mechanism PG3 is h. In the alignment chart, a lower horizontal line and an upper horizontal line (lines overlapping 4th and 6th) indicate that rotational speeds are "0" and "1" (the same rotational speed as the input shaft 32), respectively.

The fourth planetary gear mechanism PG4 is also configured as a so-called single pinion type planetary gear mechanism including, as elements, a sun gear Sd, a ring gear Rd, and a carrier Cd that rotatably and revolvably journals the pinion Pd that engages with the sun gear Sd and the ring gear Rd.

An alignment chart illustrated at a first row (a top row) from the top in FIG. 3 is an alignment chart of the fourth planetary gear mechanism PG4. As illustrated in this alignment chart, when the sun gear Sd, the carrier Cd, and the ring gear Rd that are three elements of the fourth planetary gear mechanism PG4 are a 4th element, a 5th element, and a 6th element from the left in an arrangement order at intervals corresponding to the gear ratio in the alignment chart, respectively, the 4th element is the ring gear Rd, the 5th element is the carrier Cd, and the 6th element is the sun gear Sd.

Here, a ratio between an interval from the sun gear Sd to the carrier Cd and an interval from the carrier Cd to the ring gear Rd is set to i:1 when a gear ratio of the fourth planetary gear mechanism PG4 is i.

The first planetary gear mechanism PG1 is also configured as a so-called single pinion type planetary gear mechanism having, as elements, a sun gear Sa, a ring gear Ra, and a carrier Ca that rotatably and revolvably journals the pinion Pa meshed with the sun gear Sa and the ring gear Ra.

An alignment chart illustrated at a third row from the top in FIG. 3 is an alignment chart of the first planetary gear mechanism PG1. As illustrated in this alignment chart, when the sun gear Sa, the carrier Ca, and the ring gear Ra that are three elements of the first planetary gear mechanism PG1 are a 7th element, an 8th element, and a 9th element from the left in an arrangement order at intervals corresponding to the gear ratio in the alignment chart, respectively, the seventh element is the sun gear Sa, the eighth element is the carrier Ca, and the ninth element is the ring gear Ra.

Here, a ratio between an interval from the sun gear Sa to the carrier Ca and an interval from the carrier Ca to the ring gear Ra is set to j:1 in which a gear ratio of the first planetary gear mechanism PG1 is j.

The second planetary gear mechanism PG2 is also a so-called single pinion type planetary gear mechanism that includes, as elements, a sun gear Sb, a ring gear Rb, and a carrier Cb that rotatably and revolvably journals a pinion Pb meshing with the sun gear Sb and the ring gear Rb.

An alignment chart illustrated at a fourth row (a bottom row) from the top in FIG. 3 is an alignment chart of the second planetary gear mechanism PG2. As illustrated in this alignment chart, when the sun gear Sb, the carrier Cb, and the ring gear Rb that are three elements of the second planetary gear mechanism PG2 are a 10th element, an 11th element, and a 12th element from the left in an arrangement order at intervals corresponding to the gear ratio in the alignment chart, respectively. the 10th element is the ring gear Rb, the 11th element is the carrier Cb, and the 12th element is the sun gear Sb.

Here, a ratio between an interval from the sun gear Sb to the carrier Cb and an interval from the carrier Cb to the ring gear Rb is set to k:1 in which a gear ratio of the second planetary gear mechanism PG2 is k.

The sun gear Sc (a first element) of the third planetary gear mechanism PG3 is connected to the input shaft 32. Further, the ring gear Rb (a tenth element) of the second planetary gear mechanism PG2 is connected to the output member 33 that includes an output gear.

Further, the carrier Cc (a second element) of the third planetary gear mechanism PG3, the carrier Cd (a fifth element) of the fourth planetary gear mechanism PG4, and the ring gear Ra (a ninth element) of the first planetary gear mechanism PG1 are connected to one another to constitute a first connection body Cc-Cd-Ra.

Further, the ring gear Rc (a third element) of the third planetary gear mechanism PG3 and the sun gear SU (a twelfth element) of the second planetary gear mechanism PG2 are connected to constitute the second connection body Rc-Sb.

Further, the carrier Ca (the eighth element) of the first planetary gear mechanism PG1 and the carrier Cb (the eleventh element) of the second planetary gear mechanism PG2 are connected to each other to constitute a third connection body Ca-Cb.

Further, the transmission 3 includes seven engagement mechanisms that include three clutches including a first clutch C1, a second clutch C2, and a third clutch C3, three brakes including a first brake B1, a second brake B2, and a third brake B3, and a one two-way clutch F1.

The first clutch C1 is a hydraulically actuated wet multi-plate clutch. Using the first clutch C1, the third planetary gear mechanism PG3 is configured to be switchable between a connection state in which the sun gear Sc (the first element) is connected to the third connection body Ca-Cb and an open state in which this connection is released.

The third clutch C3 is a hydraulically actuated wet multi-plate clutch. Using the third clutch C3, the third planetary gear mechanism PG3 is configured to be switchable between a connection state in which the sun gear Sc (the first element) is connected to the ring gear Rd (the fourth element) of the fourth planetary gear mechanism PG4 and an open state in which this connection is released.

The second clutch C2 is a hydraulically actuated wet multi-plate clutch. Using the second clutch C2, the fourth planetary gear mechanism PG4 is configured to be switchable between a connection state in which the sun gear Sd (the sixth element) is connected to the second connection body Rc-Sb and an open state in which this connection is released.

The two-way clutch F1 also functions as the fourth brake B4. This two-way clutch F1 is configured to be switchable between a reverse rotation prevention state in which forward rotation (rotation in the same direction as a rotation direction of the input shaft 32 and the output member 33) of the third connection body Ca-Cb is allowed and reverse rotation is prevented and a locked state in which the third connection body Ca-Cb is fixed to the transmission case 31.

The two-way clutch F1 is allowed to rotate and enters the open state when a force to rotate the third connection body Ca-Cb in the forward rotation direction is applied to the third connection body Ca-Cb in the reverse rotation prevention state. On the other hand, when a force to rotate the third connection body Ca-Cb in the reverse rotation direction is applied to the third connection body Ca-Cb, the two-way clutch F1 enters the locked state in which the rotation is prevented and the third connection body Ca-Cb is fixed to the transmission case 31.

The first brake B1 is a hydraulically actuated wet type multi-plate brake. With the first brake B1, the first planetary gear mechanism PG1 is configured to be switchable between a locked state in which the sun gear Sa (the seventh element) is fixed to the transmission case 31, and an open state in which this fixing is released.

The second brake B2 is a hydraulically actuated wet type multi-plate brake. With the second brake B2, the fourth planetary gear mechanism PG4 is configured to be switchable between a locked state in which the sun gear Sd (the sixth element) is fixed to the transmission case 31, and an open state in which this fixing is released.

The third brake B3 is a hydraulically actuated wet type multi-plate brake. With the third brake B3, the fourth planetary gear mechanism PG4 is configured to be switchable between a locked state in which the ring gear Rd (the fourth element) is fixed to the transmission case 31, and an open state in which this fixing is released.

Switching of the three clutches including the first clutch C1, the second clutch C2, and the third clutch C3, the three brakes including the first brake B1, the second brake B2, and the third brake B3, and the one two-way clutch F1 is controlled on the basis of vehicle information such as a traveling speed of the vehicle V that is transmitted from an integrated control unit (not illustrated) or the like by the control unit ECU (see FIG. 1) including a transmission control unit (TCU).

The control unit ECU is configured as an electronic unit including a CPU, a memory, and the like (not illustrated). The control unit ECU receives predetermined vehicle information such as a traveling speed or an accelerator opening degree of the vehicle V, a rotational speed or an output torque of the engine E, and information on an operation of a paddle shift lever, and executes a control program stored in a storage device such as a memory using the CPU to control the transmission 3.

In the transmission 3, the first clutch C1, the first planetary gear mechanism PG1, the second planetary gear mechanism PG2, the third planetary gear mechanism PG3, the second clutch C2, the fourth planetary gear mechanism PG4, and the third clutch C3 are arranged on an axis of the input shaft 32 in order from the engine E and the torque converter 2 side.

The third brake B3 is arranged radially outward from the fourth planetary gear mechanism PG4, the second brake B2 is arranged radially outward from the second clutch C2, the first brake B1 is arranged radially outward from the first clutch C1, and the two-way clutch F1 is arranged radially outward from the first planetary gear mechanism PG1.

Therefore, in the transmission 3, the first brake B1, the second brake B2, the third brake B3, and the two-way clutch F1 are arranged radially outward from the planetary gear mechanism or the clutch. Accordingly, an axial length of the transmission 3 is shorter as compared with a case in which the first brake B1, the second brake B2, the third brake B3, and the two-way clutch F1 are arranged side by side on the axis of the input shaft 32 together with the planetary gear mechanism.

When the third brake B3 can be arranged radially outward from the third clutch C3 and the second brake B2 can be arranged radially outward from the fourth planetary gear mechanism PG4, it is possible to similarly achieve shortening.

Here, a case in which each gear stage of the transmission 3 of the embodiment is established will be described with reference to FIGS. 3 and 4.

A speed line indicated by a broken line in FIG. 3 indicates that, following a planetary gear mechanism that transmits power among the first planetary gear mechanism PG1, the second planetary gear mechanism PG2, the third planetary gear mechanism PG3, and the fourth planetary gear mechanism PG4, each of elements of other planetary gear mechanisms rotates (idle).

Figure 4:
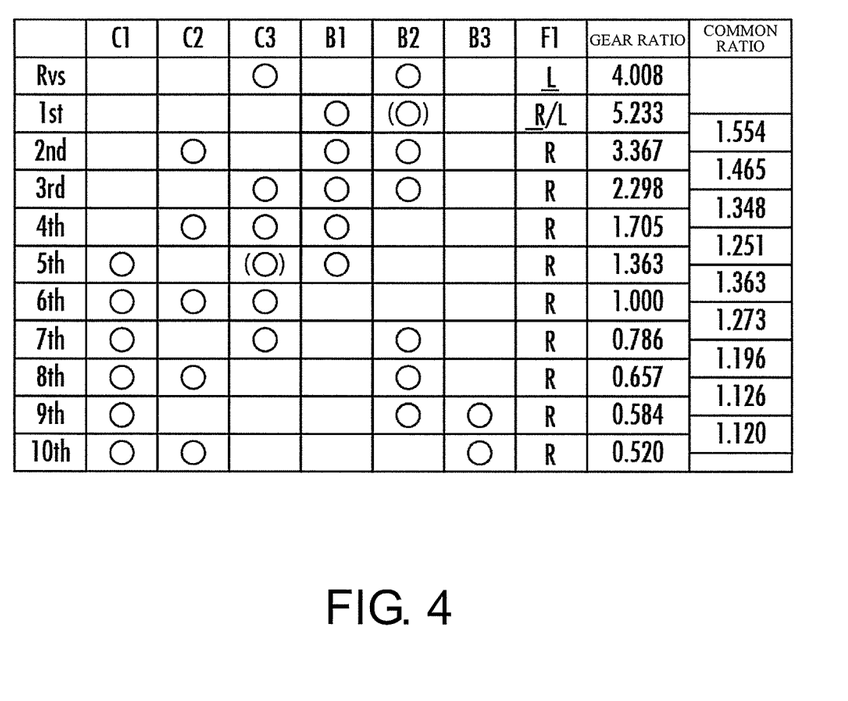
FIG. 4 is an explanatory diagram showing an engagement state of engagement mechanisms at each gear position of the transmission of FIG. 2.

FIG. 4 is a diagram is a combination of states of three clutches including the first clutch C1, the second clutch C2, and the third clutch C3, three brakes including the first brake B1, the second brake B2, and the third brake B3, and one two-way clutch F1 in each gear stage which will be described below.

In FIG. 4, "0" in columns of the first clutch C1, the second clutch C2, the third clutch C3, the first brake B1, the second brake B2, and the third brake B3 indicates the connection state or the locked state, and a blank indicates the open state. Further, "R" in the column of the two-way clutch F1 indicates a reverse rotation prevention state, and "L" indicates the locked state.

Further, underlined "R" and "L" indicate that the rotational speed of the third connection body Ca-Cb has become "0" due to action of the two-way clutch F1. Further, "R/L" indicates "R" in the reverse rotation prevention state in the normal state, but switching to "L" in the locked state when the engine brake is applied.

Further, FIG. 4 illustrates a gear ratio of each gear stage (rotational speed of the input shaft 32/rotational speed of the output member 33), and a common ratio (a ratio of gear ratios between respective gear stages. A value obtained by dividing a gear ratio of a predetermined gear stage by a gear ratio of a gear stage that is one stage higher than a predetermined gear stage) when a gear ratio h of the third planetary gear mechanism PG3 is 2.734, a gear ratio i of the fourth planetary gear mechanism PG4 is 1.614, a gear ratio j of the first planetary gear mechanism PG1 is 2.681, and a gear ratio k of the second planetary gear mechanism PG2 is 1.914. It can be seen from this that the common ratio can be set appropriately.

When the first gear stage is established, the two-way clutch F1 is set to the reverse rotation prevention state (R in FIG. 4), and the first brake B1 and the second brake B2 are set to a locked state.

By setting the two-way clutch F1 to the reverse rotation prevention state (R) and the first brake B1 to the locked state, the reverse rotation of the third connection body Ca-Cb and the sun gear Sa (the seventh element) of the first planetary gear mechanism PG1 is prevented, and the rotational speed of the third connection body Ca-Cb and the sun gear Sa (the seventh element) of the first planetary gear mechanism PG1 becomes "0".

Accordingly, the sun gear Sa (the seventh element), the carrier Ca (the eighth element), and the ring gear Ra (the ninth element) of the first planetary gear mechanism PG1 enter a locked state in which relative rotation is impossible, and the rotational speed of the first connection body Cc-Cd-Ra including the ring gear Ra (the ninth element) of the first planetary gear mechanism PG1 also becomes "0".

The rotational speed of the ring gear Rb (the tenth element) of the second planetary gear mechanism PG2 to which the output member 33 is connected becomes "1st" illustrated in FIG. 3, and the first gear stage is established.

In order to establish the first gear stage, it is not necessary to set the second brake B2 to the locked state. However, it is set to the locked state at the first gear stage in order to smoothly shift from the first gear stage to the second gear stage to be described below. Further, when an engine brake is applied at the first gear stage, the two-way clutch F1 may be switched from the reverse rotation prevention state (R) to the locked state (L).

When the second gear stage is established, the two-way clutch F1 is set to the reverse rotation prevention state (R), the first brake B1 and the second brake B2 are set to the locked state, and the second clutch C2 is set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0". Further, by setting the second brake B2 to the locked state, the rotational speed of the sun gear Sd (the sixth element) of the fourth planetary gear mechanism PG4 becomes "0".

Further, by setting the second clutch C2 to the connection state, the rotational speed of the second connection body Rc-Sb becomes "0", which is the same speed as the rotational speed of the sun gear Sd (the sixth element) of the fourth planetary gear mechanism PG4.

The rotational speed of the ring gear Rb (the tenth element) of the second planetary gear mechanism PG2 to which the output member 33 is connected becomes "2nd" illustrated in FIG. 3, and the second gear stage is established.

When the third gear stage is established, the two-way clutch F1 is set to the reverse rotation prevention state, the first brake B1 and the second brake B2 are set to the locked state, and the third clutch C3 is set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0". Further, by setting the second brake B2 to the locked state, the rotational speed of the sun gear Sd (the sixth element) of the fourth planetary gear mechanism PG4 becomes "0".

Further, by setting the third clutch C3 to the connection state, the rotational speed of the ring gear Rd (the fourth element) of the fourth planetary gear mechanism PG4 becomes "1", which is the same speed as the rotational speed of the sun gear Sc (the first element) of the third planetary gear mechanism PG3 connected to the input shaft 32.

Accordingly, since the rotational speed of the sun gear Sd (the sixth element) of the fourth planetary gear mechanism PG4 becomes "0" and the rotational speed of the ring gear Rd (the fourth element) becomes "1", the rotational speed of the carrier Cd (the fifth element), that is, the rotational speed of the first connection body Cc-Cd-Ra is $i/(i+1)$.

The rotational speed of the ring gear Rb (the tenth element) of the second planetary gear mechanism PG2 to which the output member 33 is connected becomes "3rd" illustrated in FIG. 3, and the third gear stage is established.

When the 4th gear stage is established, the two-way clutch F1 is set to the reverse rotation prevention state, the first brake B1 is set to the locked state, and the second clutch C2 and the third clutch C3 are set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0".

Further, by setting the second clutch C2 to the connection state, the sun gear Sd (the sixth element) of the fourth planetary gear mechanism PG4 and the second connection body Rc-Sb rotate at the same speed. Accordingly, between the third planetary gear mechanism PG3 and the fourth planetary gear mechanism PG4, the carrier Cc (the second element) and the carrier Cd (the fifth element) are connected, and the ring gear Re (the third element) and the sun gear Sd (the sixth element) are connected. Therefore, in the 4th gear stage in which the second clutch C2 is connected, one alignment chart including four elements can be drawn by the third planetary gear mechanism PG3 and the fourth planetary gear mechanism PG4.

Further, by setting the third clutch C3 to the connection state, the rotational speed of the ring gear Rd (the fourth element) of the fourth planetary gear mechanism PG4 becomes "1" that is the same as the rotational speed of the sun gear Sc (the first element) of the third planetary gear mechanism PG3, and the rotational speeds of two elements among the four elements configured by the third planetary gear mechanism PG3 and the fourth planetary gear mechanism PG4 become "1" which is the same speed.

Accordingly, the respective elements of the third planetary gear mechanism PG3 and the fourth planetary gear mechanism PG4 enter a locked state in which relative rotation is impossible, and the rotational speeds of all the elements of the third planetary gear mechanism PG3 and the fourth planetary gear mechanism PG4 become "1". Further, the rotational speed of the third connection body Ca-Cb becomes j/(j+1).

The rotational speed of the ring gear Rb (the tenth element) of the second planetary gear mechanism PG2 to which the output member 33 is connected becomes "4th" illustrated in FIG. 3, and the 4th gear stage is established.

When the 5th gear stage is established, the two-way clutch F1 is set to the reverse rotation prevention state, the first brake B1 is set to the locked state, and the first clutch C1 and the third clutch C3 are set to the connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0".

Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "5th" illustrated in FIG. 3, and the fifth gear stage is established.

In order to establish the 5th gear stage, it is not necessary to set the third clutch C3 to the connection state. However, in the 4th gear stage and the 6th gear stage to be described below, since it is necessary to set the third clutch C3 to the connection state, the connection state is set in the 5th gear stage so that downshift from the 5th gear stage to the 4th gear stage and upshift from the 5th gear stage to the 6th gear stage to be described below are smoothly performed.

When the 6th gear stage is established, the two-way clutch F1 is set to the reverse rotation prevention state, and the first clutch C1, the second clutch C2, and the third clutch C3 are set to the connection state.

By setting the two-way clutch F1 to the reverse rotation prevention state, the forward rotation of the third connection body Ca-Cb is allowed.

Further, by setting the second clutch C2 and the third clutch C3 to the connection state, the respective elements of the third planetary gear mechanism PG3 and the fourth planetary gear mechanism PG4 enter a locked state in which the relative rotation is impossible, and the rotational speed of the second connection body Rc-Sb becomes "1", as described in the description of the 4th gear stage. Further, by setting the first clutch C1 to the connection state, the rotational speed of the third connection body Ca-Cb becomes "1".

Accordingly, the carrier Cb (the eleventh element) and the sun gear Sb (the twelfth element) of the second planetary gear mechanism PG2 become the same speed "1", and the respective elements enter the locked state in which relative rotation is impossible.

The rotational speed of the ring gear Rb (the tenth element) of the second planetary gear mechanism PG2 to which the output member 33 is connected becomes "1" of "6th" illustrated in FIG. 3, and the 6th gear stage is established.

When the seventh gear is established, the two-way clutch F1 is set to the reverse rotation prevention state, the second brake B2 is set to the locked state, and the first clutch C1 and the third clutch C3 are set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0".

Further, by setting the third clutch C3 to the connection state, the rotational speed of the ring gear Rd (the fourth element) of the fourth planetary gear mechanism PG4 becomes "1" which is the same speed as the rotational speed of the sun gear Sc (the first element) of the third planetary gear mechanism PG3, and the rotational speed of the first connection body Cc-Cd-Ra including the carrier Cd (the fifth element) of the fourth planetary gear mechanism PG4 becomes i/(i+1). Further, by setting the first clutch C1 to the connection state, the rotational speed of the third connection body Ca-Cb becomes "1" that is the same speed as the rotational speed of the sun gear Sc (the first element) of the third planetary gear mechanism PG3 connected to the input shaft 32.

The rotational speed of the ring gear Rb (the tenth element) of the second planetary gear mechanism PG2 to which the output member 33 is connected becomes "7th" illustrated in FIG. 3, and the seventh gear stage is established.

When the 8th gear stage is established, the two-way clutch F1 is set to the reverse rotation prevention state, the second brake B2 is set to the locked state, and the first clutch C1 and the second clutch C2 are set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0".

Further, by setting the second clutch C2 to the connection state, the rotational speed of the second connection body Rc-Sb becomes "0" which is the same speed as the rotational speed of the sun gear Sd (the sixth element) of the fourth planetary gear mechanism PG4. Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "8th" illustrated in FIG. 3, and the 8th gear stage is established.

When the 9th gear stage is established, the two-way clutch F1 is set to the reverse rotation prevention state, the second brake B2 and the third brake B3 are set to the locked state, and the first clutch C1 is set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0". Further, by setting the third brake B3 to the locked state, the rotational speed of the ring gear Rd (the fourth element) of the fourth planetary gear mechanism PG4 also becomes "0".

Accordingly, the sun gear Sd (the sixth element), the carrier Cd (the fifth element), and the ring gear Rd (the fourth element) of the fourth planetary gear mechanism PG4 enter the locked state in which relative rotation is impossible, and the rotational speed of the first connection body Cc-Cd-Ra including the carrier Cd (the fifth element) of the fourth planetary gear mechanism PG4 is also "0".

Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "9th" illustrated in FIG. 3, and the 9th gear stage is established.

When the 10th gear stage is established, the two-way clutch F1 is set to the reverse rotation prevention state, the third brake B3 is set to the locked state, and the first clutch C1 and the second clutch C2 are set to the connection state.

By setting the two-way clutch F1 to the reverse rotation prevention state, the forward rotation of the third connection body Ca-Cb is allowed. Further, by setting the third brake B3 to the locked state, the rotational speed of the ring gear Rd (the fourth element) of the fourth planetary gear mechanism PG4 becomes "0".

Further, by setting the second clutch C2 to the connection state, the second connected body Rc-Sb and the sun gear Sd (the sixth element) of the fourth planetary gear mechanism PG4 rotate at the same speed. Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "10th" illustrated in FIG. 3, and the 10th gear stage is established.

When the reverse stage is established, the two-way clutch F1 is set to the locked state (L in FIG. 4), the second brake B2 is set to the locked state, and the third clutch C3 is set to the connection state.

By setting the second brake B2 to the locked state and setting the third clutch C3 to the connection state, the rotational speed of the first connection body Cc-Cd-Ra becomes i/(i+1). Further, by setting the two-way clutch F1 to the locked state, the rotational speed of the third connection body Ca-Cb becomes "0".

The rotational speed of the ring gear Rb (the tenth element) of the second planetary gear mechanism PG2 to which the output member 33 is connected becomes "Rvs" which is reverse rotation illustrated in FIG. 3, and the reverse stage is established.

Figure 5:
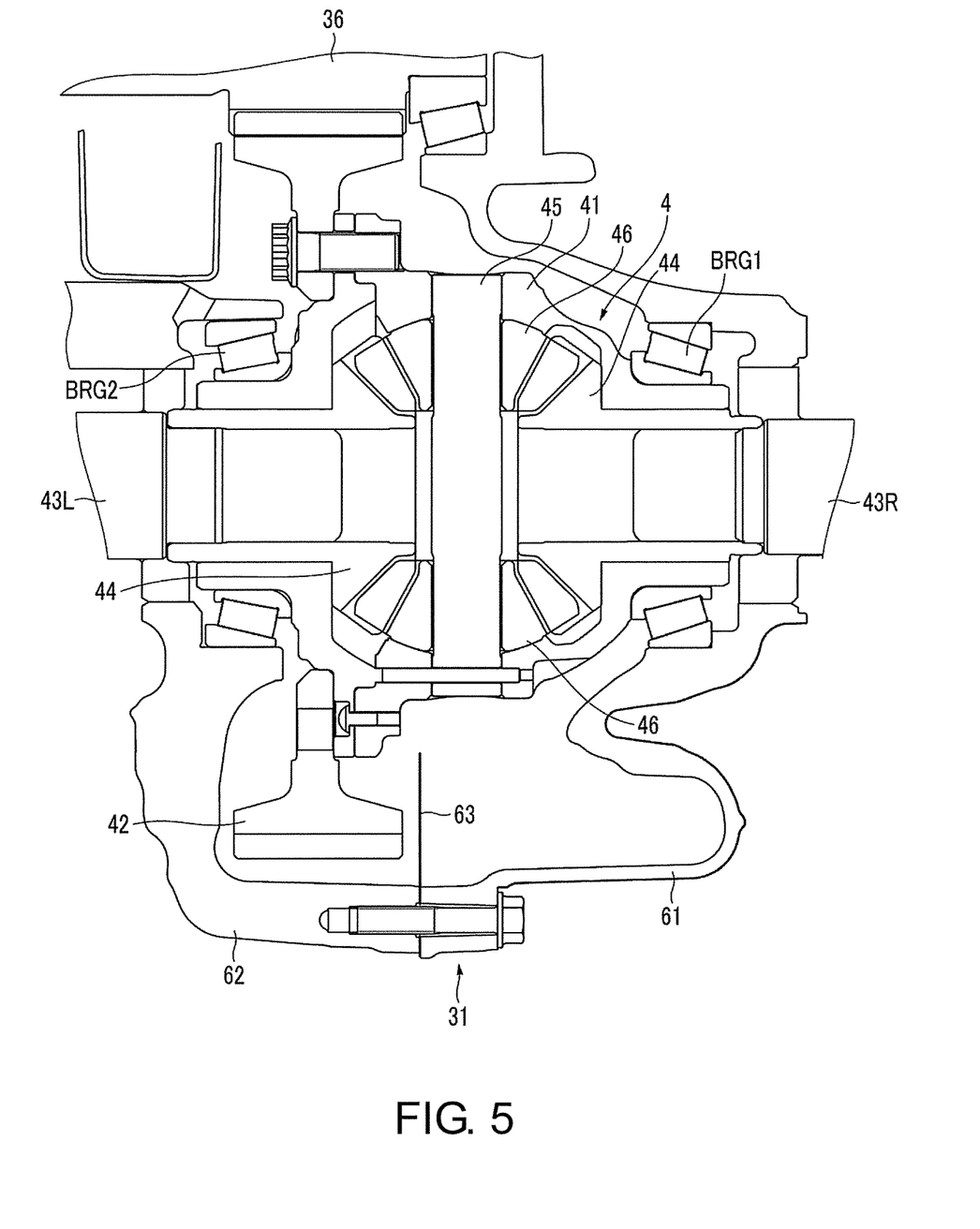
FIG. 5 is a front view showing a main part of a transmission case of the power transmission device of FIG. 1 as a cross-section.

Returning to FIG. 2, the front differential gear 4 includes a differential case 41 which is rotatably supported by the transmission case 31 of the transmission 3 (see FIG. 5). The final driven gear 42 meshing with the final drive gear 36 provided in the idle shaft 35 is fixed to the outer periphery of the differential case 41.

The rotation of the idle shaft 35 of the transmission 3 is transmitted to the differential case 41 through the final drive gear 36 and the final driven gear 42. The rotation of the differential case 41 is transmitted to the front left axle 7L and the front right axle 7R in response to the load of the left front wheel WFL and the right front wheel WFR.

A front left output shaft 43L connected to the front left axle 7L and a front right output shaft 43R connected to the front right axle 7R are fitted to the differential case 41 to be relatively rotatable. The differential side gear 44 is spline-connected to each of facing ends of the front left output shaft 43L and the front right output shaft 43R.

A pinion shaft 45 is fixed into the differential case 41 so as to be orthogonal to the front left output shaft 43L and the front right output shaft 43R. A pair of pinions 46 respectively meshing with two differential side gears 44 is rotatably supported by the pinion shaft 45.

The transfer device 5 includes a transfer input shaft 51 to which the driving force is transmitted from the final driven gear 42 of the front differential gear 4 and a transfer output shaft 52 to which the driving force is transmitted from the transfer input shaft 51 so that the driving force is transmitted to the propeller shaft 8.

A transfer input gear 53 meshing with the final driven gear 42 is spline-fitted to and rotatably journaled to an end portion on the front differential gear 4 side of the transfer input shaft 51. An opposite end portion of the transfer input shaft 51 is provided with a first bevel gear 54 which is a helical gear.

An end portion (a front end) on the transfer input shaft 51 side of the transfer output shaft 52 is provided with a second bevel gear 55 which is a helical gear. Meanwhile, an end portion of the propeller shaft 8 is coupled to a rear end of the transfer output shaft 52.

When the first bevel gear 54 meshes with the second bevel gear 55, the rotation of the transfer input shaft 51 is transmitted to the propeller shaft 8 (see FIG. 1) through the transfer output shaft 52.

Next, the transmission case 31 (the case) and a lubricating oil supply structure (a lubricating fluid supply structure) of the power transmission device PT provided therein will be described with reference to FIGS. 5 to 8. An arrow in FIGS. 7A, 7B and 8 indicates a flow direction of the lubricating oil (the lubricating fluid).

The lubricating oil supply structure to be described below supplies the lubricating oil to a built-in part (for example, the idle shaft 35 (see FIG. 2)) to which the lubricating oil needs to be supplied with the highest priority among the plurality of built-in parts disposed inside the transmission case 31 of the power transmission device PT through a supply pipe 64*a* (see FIG. 6).

As shown in FIG. 5, the transmission case 31 is formed by engaging a TC-side case member 61 and a TM-side case member 62 with each other at the opening edges. Further, a gasket 63 is sandwiched between the opening edge of the TC-side case member 61 and the opening edge of the TM-side case member 62 in order to prevent the leakage of the lubricating oil therein.

In the transmission case 31, the differential case 41 is rotatably journaled by a first bearing BRG1 and a second bearing BRG2 (non-priority parts). The final driven gear 42 is provided at the outer periphery of the differential case 41. For that reason, the final driven gear 42 can be rotatably journaled by the transmission case 31 through the first bearing BRG1, the second bearing BRG2, and the differential case 41.

The first bearing BRG1 is fixed to the TC-side case member 61. The second bearing BRG2 is fixed to the TM-side case member 62.

Figure 6:
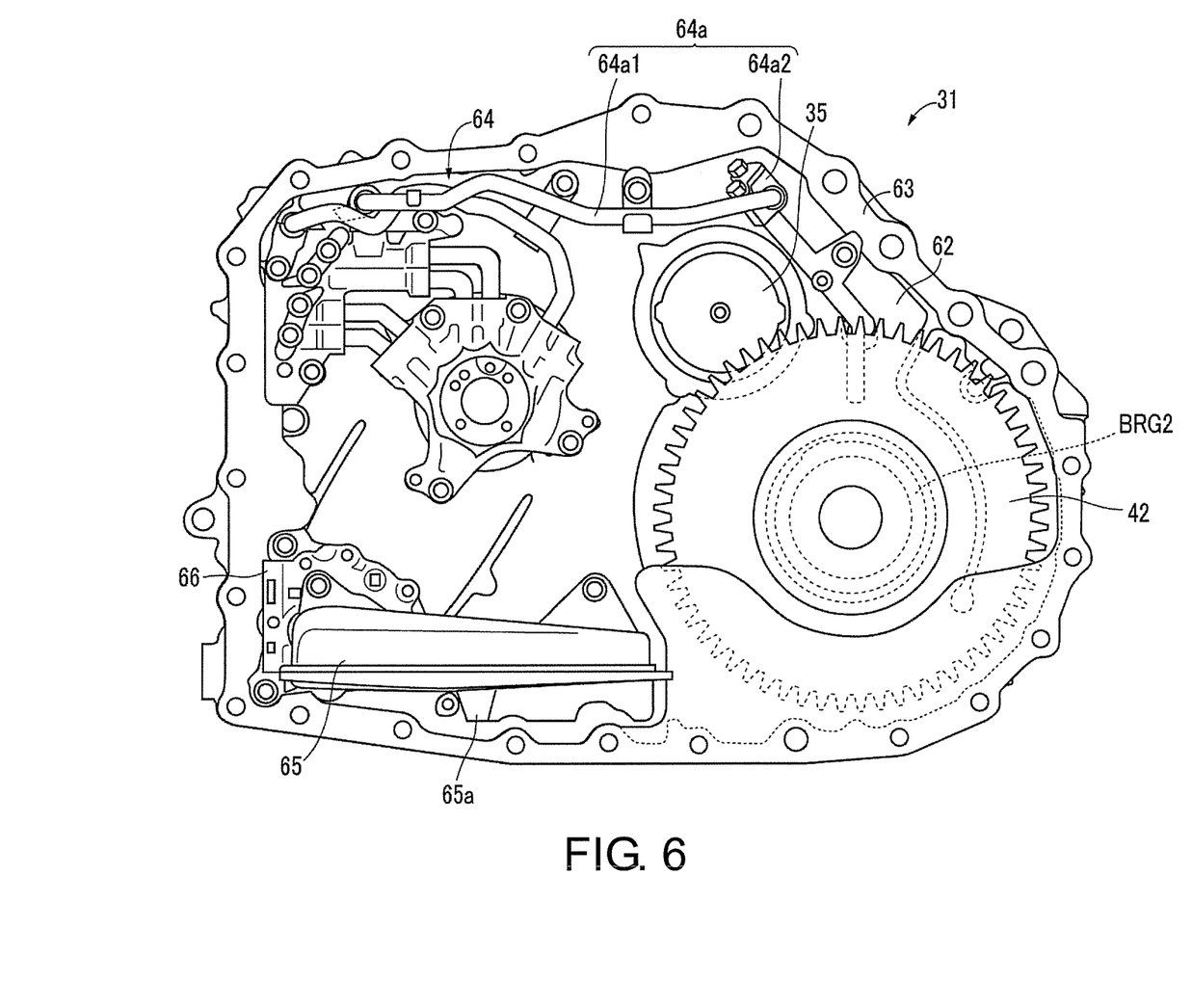
FIG. 6 is a side view showing a TM-side case member of the transmission case of FIG. 5 and a part fixed thereto.

As shown in FIG. 6, the idle shaft 35 (the priority part), the second bearing BRG2 that axially supports the final driven gear 42 (that is, the front differential gear 4 (the non-priority part)) to be rotatable, a strainer 65, and a pump 66 are provided in the TM-side case member 62.

A discharge mechanism 64 is disposed at a position corresponding to a hydraulic operation mechanism such as the torque converter 2 in an upper inner space of the TM-side case member 62. The discharge mechanism 64 is a mechanism which discharges (supplies) at least a portion of the hydraulic oil used in the hydraulic operation mechanism toward the inside of the transmission case 31 as the lubricating oil through the supply pipe 64*a*.

The strainer 65 and the pump 66 are disposed at a position (that is, a front position in the traveling direction of the vehicle V) separated from the final driven gear 42 in a direction intersecting the rotation center axis of the final driven gear 42 and located at a position near the TC-side case member 61 in relation to the gasket 63 (that is, the end surface of the TM-side case member 62) in the lower inner space of the TM-side case member 62.

A suction port 65*a* which sucks the lubricating oil from the oil reservoir is provided at the center portion of the lower surface of the strainer 65. The pump 66 sucks the lubricating oil from the lower oil reservoir of the transmission case 31 through the suction port 65*a* of the strainer 65 and supplies the lubricating oil to the hydraulic operation mechanism.

Figure 7A:
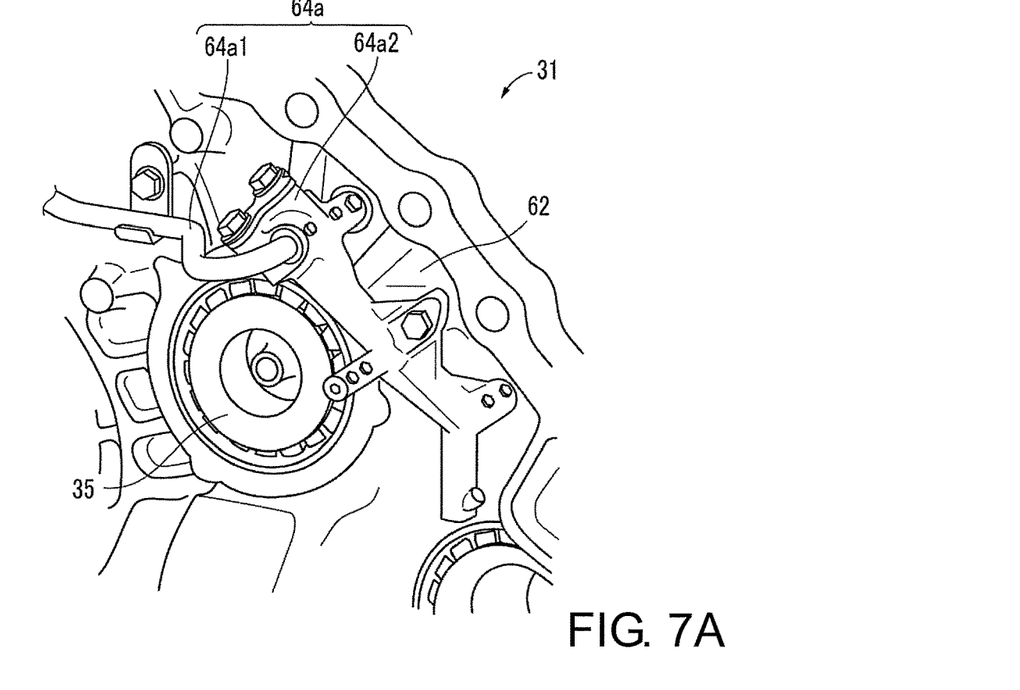

As shown in FIGS. 6 and 7A, the supply pipe 64*a* is formed by connecting a first pipe member 64*a*1 and a second pipe member 64*a*2.

Figure 7B:
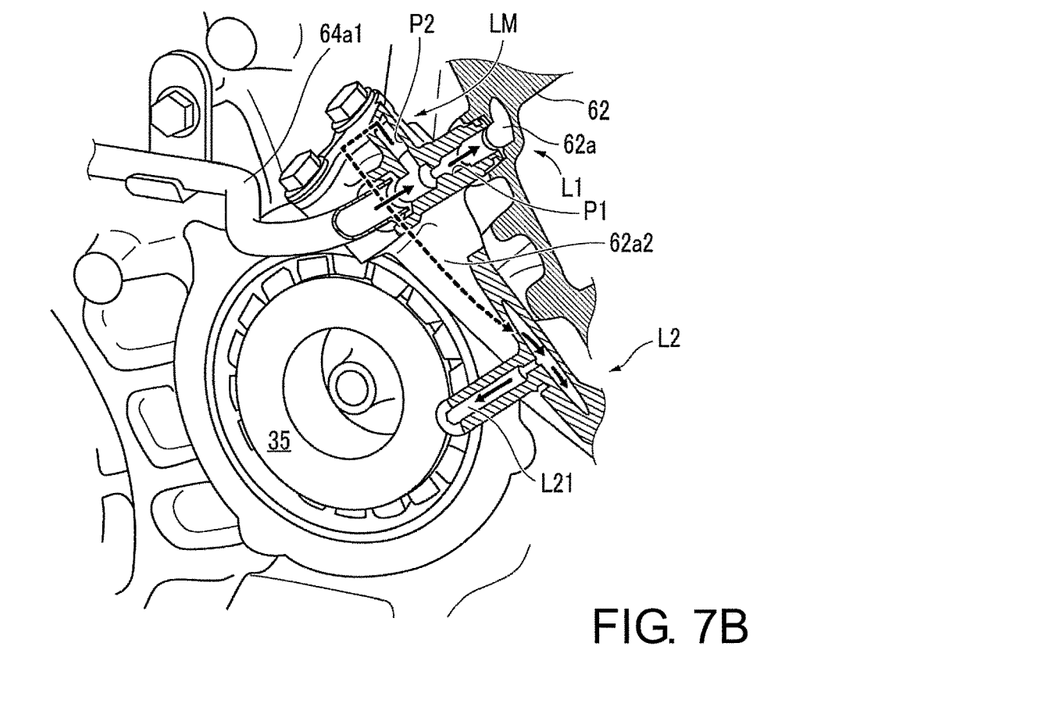

As shown in FIG. 7B, the supply pipe 64*a* is divided into a portion corresponding to a first main pipe line L1 connected to the priority part, a portion corresponding to a second main pipe line L2 connected to the non-priority part, and a portion corresponding to an intermediate pipe line LM located between the first main pipe line L1 and the second main pipe line L2.

The second pipe member 64*a*2 includes a transverse passage P1 which is connected to the front end of the first pipe member 64*a*1 and extends in the horizontal direction and a reverse U-shaped passage P2. After branching upward from the middle portion of the transverse passage P1, the U-shaped passage P2 is bent in a reverse U-shape and extends downward.

The first main pipe line L1 includes the first pipe member 64*a*1 and the transverse passage P1. The transverse passage P1 constituting the first main pipe line L1 is connected to a hole portion 62*a* of the TM-side case member 62. The hole portion 62*a* communicates with a bearing axially supporting the idle shaft 35.

Further, the intermediate pipe line LM is formed by a U-shaped portion at an upper portion of the reverse U-shaped passage P2, and the second main pipe line L2 is formed by a lower portion extending downward in the reverse U-shaped passage P2.

Figure 8:
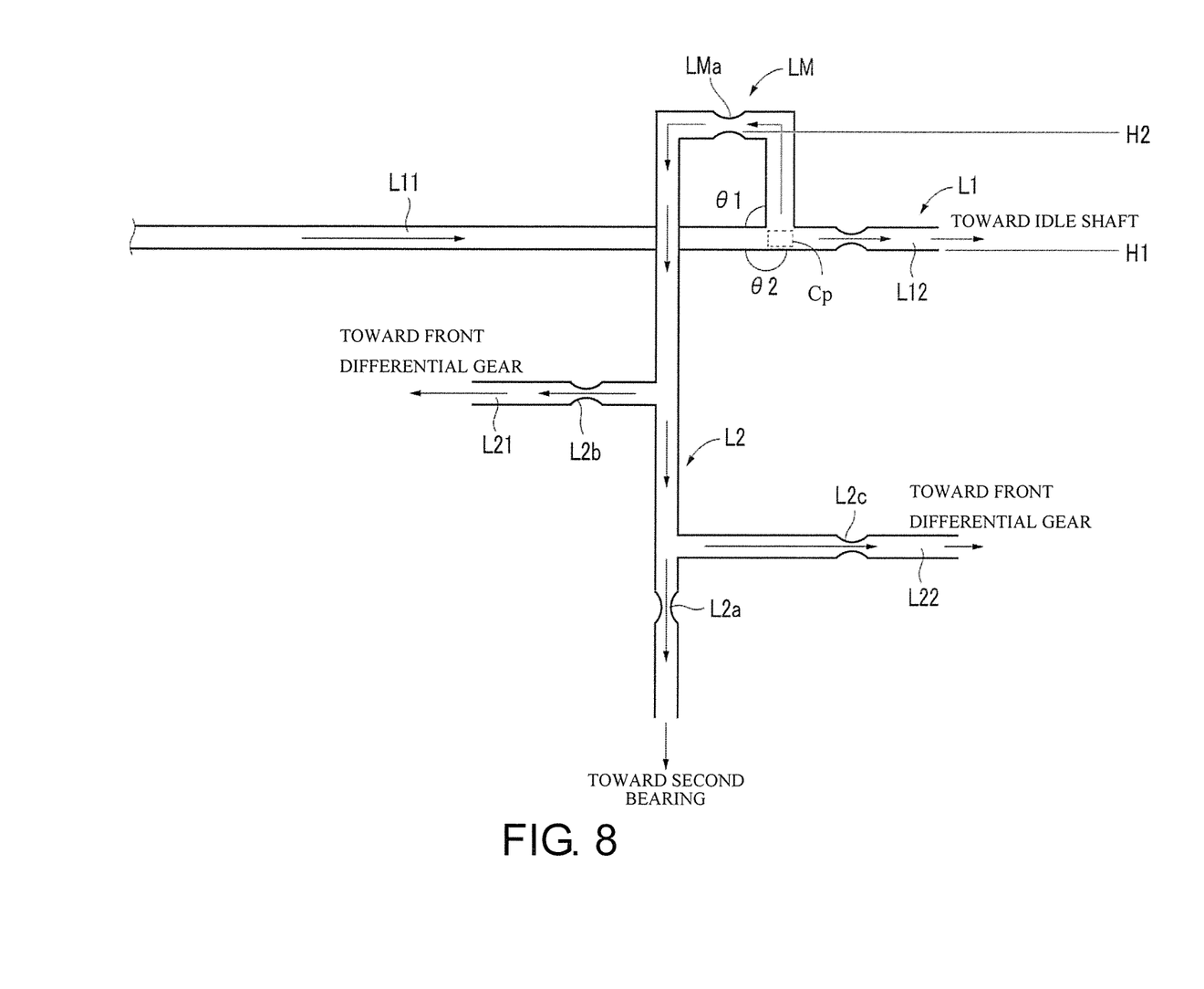
FIG. 8 is a schematic diagram showing a structure of the supply pipe fixed to the transmission case of FIG. 5.

As shown in FIG. 8, a first branch pipe line L21 and a second branch pipe line L22 are provided to be branched from the second main pipe line L2.

A portion of the lubricating oil flowing in the supply pipe 64*a* is supplied to the idle shaft 35 through the first main pipe line L1. Further, another portion of the lubricating oil is supplied to each of the second bearing BRG2 and the front differential gear 4 through the second main pipe line L2, the first branch pipe line L21, and the second branch pipe line L22.

Incidentally, the built-in parts to which the lubricating oil is supplied through the supply pipe 64*a* do not need the same amount of the lubricating oil.

Specifically, the idle shaft 35 is located at the upper portion of the transmission case 31 and is not easily lubricated by the lubricating oil raised by the final driven gear 42. Thus, there is a need to stably (that is, preferentially) supply the lubricating oil from the supply pipe 64*a* to the idle shaft 35.

Meanwhile, since the lubricating oil raised by the final driven gear 42 from the oil reservoir formed at the lower portion of the transmission case 31 is supplied to the second bearing BRG2 and the front differential gear 4, no big problem arises even when the amount of the lubricating oil supplied from the supply pipe 64*a* is not stable (that is, without priority).

That is, the idle shaft 35 becomes a priority part to which the lubricating oil is supplied from the supply pipe 64*a* with high priority. Meanwhile, the second bearing BRG2 and the front differential gear 4 become non-priority parts to which the lubricating oil is supplied from the supply pipe 64*a* with low priority.

Generally, the amount of the lubricating oil distributed to the built-in parts is controlled by the size of the diameter (the cross-sectional area) of the orifice formed in the supply pipe 64*a*. However, there is concern that the lubricating oil will not be able to be supplied according to a desired distribution amount when the amount of the lubricating oil supplied to the supply pipe 64*a* decreases.

Here, since the first main pipe line L1, the intermediate pipe line LM, and the second main pipe line L2 are provided in the supply pipe 64*a* as described below, the amount of the lubricating oil supplied to the idle shaft 35 which is the priority part is stabilized.

As shown in FIG. 8, the intermediate pipe line LM extends to be branched upward in the vertical direction from the first main pipe line L1. For that reason, a flow path bottom surface (a first height H1 in FIG. 8) of the connection part Cp between the first main pipe line L1 and the intermediate pipe line LM is lower than a flow path bottom surface (a second height H2 in FIG. 8) located at the highest position of the flow path bottom surface of the intermediate pipe line LM.

Accordingly, since it is possible to prevent the lubricating oil from flowing from the first main pipe line L1 to the intermediate pipe line LM when the lubricating oil supply amount is small in the supply pipe 64a, the lubricating oil preferentially flows into the first main pipe line L1.

In addition, a first angle θ1(90°) which is formed by the first main pipe line L1 and the intermediate pipe line LM is set to be smaller than a second angle θ2(180°) which is formed by an upstream portion L11 which is an upstream portion of the first main pipe line L1 in relation to the connection part Cp between the first main pipe line L1 and the intermediate pipe line LM and a downstream portion L12 which is a downstream portion of the first main pipe line L1 in relation to the connection part Cp. Further, a first orifice LMa is provided in the intermediate pipe line LM, and a cross-sectional area of the first orifice LMa is set to be smaller than a cross-sectional area of the first main pipe line L1.

With this configuration, the inflow of the lubricating oil from the first main pipe line L1 to the intermediate pipe line LM in the supply pipe 64a is suppressed.

As a result, in the above-described lubricating oil supply structure, the lubricating oil can be stably supplied to the idle shaft 35 (the priority part) connected to the first main pipe line L1.

Thus, according to the above-described lubricating oil supply structure, since the flow of the lubricating oil to the intermediate pipe line LM (further, the non-priority part) is suppressed, the lubricating oil can be supplied to the priority part connected to the first main pipe line L1 with high priority.

Incidentally, the cross-sectional area of the first orifice LMa is set to be smaller than the cross-sectional area of the first main pipe line L1. Also, the cross-sectional area of the first orifice LMa is set to be larger than the sum of a minimal cross-sectional area of the second main pipe line L2 (that is, a cross-sectional area of the second orifice L2a), a minimal cross-sectional area of the first branch pipe line L21 (that is, a cross-sectional area of the third orifice L2b), and a minimal cross-sectional area of the second branch pipe line L22 (that is, a cross-sectional area of the fourth orifice L2c).

For that reason, in the supply pipe 64a, the amount of the lubricating oil flowing from the intermediate pipe line LM to the second main pipe line L2 becomes larger than the amount of the lubricating oil discharged from the second main pipe line L2, the first branch pipe line L21, and the second branch pipe line L22. Thus, when the flow rate of the lubricating oil in the supply pipe 64a is large, the lubricating oil can be accumulated in the intermediate pipe line LM and the second main pipe line L2 to a certain degree.

Accordingly, even when the flow rate of the lubricating oil inside the supply pipe 64a becomes small and the priority part connected to the first main pipe line L1 is lubricated preferentially, the lubricating oil can also be supplied to the non-priority parts to a certain degree by the lubricating oil accumulated inside the intermediate pipe line LM.

In addition, the cross-sectional area of the first orifice LMa provided in the intermediate pipe line LM is not limited to the above-described size and may be appropriately changed in response to the average flow rate of the lubricating oil.

While the embodiment has been described with reference to the drawings, the disclosure is not limited to such an embodiment.

For example, in the above-described embodiment, the supply pipe 64a includes the first pipe member 64a1 and the second pipe member 64a2. This is because the second pipe member 64a2 connected to the non-priority part is formed of a highly workable material to appropriately limit the amount of the lubricating oil distributed to the non-priority part and the lubricating oil distribution amount is specified also by the processing depth for the second pipe member 64a2 in addition to the diameter of the orifice.

However, the supply pipe of the disclosure is not limited to such a configuration, and may be any one that includes the first main pipe line, the intermediate pipe line, and the second main pipe line. For example, the supply pipe may include a single member or may include three or more members.

Further, in the above-described embodiment, since the first main pipe line L1 supplies the lubricating oil only to the idle shaft 35, the branch pipe line is not provided. However, the first main pipe line of the disclosure is not limited to such a configuration. For example, when there are a plurality of priority parts, the branch pipe line may be provided in the first main pipe line in response to the number of priority parts.

Further, in the above-described embodiment, the intermediate pipe line LM extends to be branched from the first main pipe line L1 upward in the vertical direction. This is because a shape in which the flow path bottom surface (H1) of the connection part Cp between the first main pipe line L1 and the intermediate pipe line LM is lower than the flow path bottom surface (H2 in FIG. 8) located at the highest position of the flow path bottom surface of the intermediate pipe line LM is easily realized when the intermediate pipe line LM is set to a high position on the whole.

However, the first main pipe line and the intermediate pipe line of the disclosure are not limited to such a configuration. For example, even when the intermediate pipe line is horizontally branched from the first main pipe line, it is acceptable as long as the flow path bottom surface of any part of the intermediate pipe line is higher than the flow path bottom surface of the connection part Cp between the intermediate pipe line and the first main pipe line. For example, the intermediate pipe line may be formed to be branched slightly upward from the first main pipe line rather than in the horizontal direction.

Further, in the above-described embodiment, the first angle θ1 formed between the first main pipe line L1 and the intermediate pipe line LM is set to be smaller than the second angle θ2 formed between the upstream portion L11 and the downstream portion L12 of the first main pipe line L1, and the downstream portion L12 is formed to extend linearly with respect to the upstream portion L11. This is because the lubricating oil does not easily flow from the first main pipe line L1 to the intermediate pipe line LM.

However, the angle formed between the first main pipe line and the intermediate pipe line and the shape of the first main pipe line of the disclosure are not limited to such a configuration. For example, when the intermediate pipe line is connected to a portion in which the first main pipe line is bent downward, the first main pipe line may be formed to extend linearly with respect to the intermediate pipe line.

Further, in the above-described embodiment, the cross-sectional area of the first main pipe line L1 and the cross-sectional area of the intermediate pipe line LM are set to be substantially the same size, the first orifice LMa is provided in the intermediate pipe line LM, and the cross-sectional area of the first orifice LMa is set to be smaller than the cross-sectional area of the first main pipe line L1. This is because the lubricating oil is easily accumulated in the first main pipe line L1 by suppressing the inflow of the lubricating oil toward the downstream side of the first orifice LMa of the intermediate pipe line LM by the first orifice LMa.

However, the intermediate pipe line of the disclosure is not limited to such a configuration. For example, the cross-sectional area of the entire intermediate pipe line may be set to be smaller than the cross-sectional area of the first main pipe line without providing the orifice. Further, the cross-sectional area of the intermediate pipe line LM may not be the same as the cross-sectional area of the first main pipe line L1 and may be set to be larger than the cross-sectional area of the first main pipe line L1 or may be set to be smaller than the cross-sectional area of the first main pipe line L1.

What is claimed is:

1. A lubricating fluid supply structure of a power transmission device for supplying a lubricating fluid to a plurality of built-in parts disposed inside a case of the power transmission device through a supply pipe,
    wherein the supply pipe includes a first main pipe line, an intermediate pipe line connected to the first main pipe line, and a second main pipe line connected to the intermediate pipe line,
    wherein the first main pipe line is connected to a priority part to which the lubricating fluid is supplied with high priority among the plurality of built-in parts such that a supply of the lubricating fluid to the priority part of the power transmission device is maintained even when a flow rate of the lubricating fluid in the supply pipe becomes small,
    wherein the second main pipe line is connected to a non-priority part to which the lubricating fluid is supplied with low priority among the plurality of built-in parts such that a supply of the lubricating fluid to the non-priority part of the power transmission device is suppressed when the flow rate of the lubricating fluid in the supply pipe becomes small,
    wherein a connection part is formed at a junction between the first main pipe line and the intermediate pipe line, and a flow path bottom surface of the connection part is lower than a surface located at a highest position of a flow path bottom surface of the intermediate pipe line,
    wherein an orifice is provided in the intermediate pipe line,
    wherein a branch pipe line connected to the non-priority part is provided in the second main pipe line, and
    wherein a cross-sectional area of the orifice is set to be larger than a sum of a minimal cross-sectional area of the second main pipe line and a minimal cross-sectional area of the branch pipe line.

2. The lubricating fluid supply structure of the power transmission device according to claim 1,
    wherein an angle formed between the first main pipe line and the intermediate pipe line is smaller than an angle formed between an upstream portion of the first main pipe line in relation to the connection part between the first main pipe line and the intermediate pipe line and a downstream portion of the first main pipe line in relation to the connection part.

3. The lubricating fluid supply structure of the power transmission device according to claim 2,
    wherein the downstream portion of the first main pipe line in relation to the connection part between the first main pipe line and the intermediate pipe line extends linearly with respect to the upstream portion of the first main pipe line in relation to the connection part.

4. The lubricating fluid supply structure of the power transmission device according to claim 3,
    wherein a part of the intermediate pipe line connected to the first main pipe line extends upward rather than in a horizontal direction.

5. The lubricating fluid supply structure of the power transmission device according to claim 4,
    wherein a cross-sectional area of the orifice is set to be smaller than a cross-sectional area of the first main pipe line.

6. The lubricating fluid supply structure of the power transmission device according to claim 3,
    wherein a cross-sectional area of the orifice is set to be smaller than a cross-sectional area of the first main pipe line.

7. The lubricating fluid supply structure of the power transmission device according to claim 2,
    wherein a part of the intermediate pipe line connected to the first main pipe line extends upward rather than in a horizontal direction.

8. The lubricating fluid supply structure of the power transmission device according to claim 7,
    wherein a cross-sectional area of the orifice is set to be smaller than a cross-sectional area of the first main pipe line.

9. The lubricating fluid supply structure of the power transmission device according to claim 2,
    wherein a cross-sectional area of the orifice is set to be smaller than a cross-sectional area of the first main pipe line.

10. The lubricating fluid supply structure of the power transmission device according to claim 1,
    wherein a part of the intermediate pipe line connected to the first main pipe line extends upward rather than in a horizontal direction.

11. The lubricating fluid supply structure of the power transmission device according to claim 10,
    wherein a cross-sectional area of the orifice is set to be smaller than a cross-sectional area of the first main pipe line.

12. The lubricating fluid supply structure of the power transmission device according to claim 1,
    wherein a cross-sectional area of the orifice is set to be smaller than a cross-sectional area of the first main pipe line.

* * * * *